United States Patent [19]

Heyne

[11] Patent Number: 4,940,182

[45] Date of Patent: Jul. 10, 1990

[54] ROTARY SWIVEL FOR CAB HEATING SYSTEM

[75] Inventor: Dennis J. Heyne, Wausau, Wis.

[73] Assignee: J. I. Case Company, Racine, Wis.

[21] Appl. No.: 427,384

[22] Filed: Oct. 27, 1989

[51] Int. Cl.$^5$ .............................................. B60H 1/02
[52] U.S. Cl. ............................ 237/12.3 B; 237/12.3 R
[58] Field of Search ...................... 237/12.3 R, 12.3 A, 237/12.3 B; 122/26; 126/247

[56] References Cited

U.S. PATENT DOCUMENTS 4,352,456 10/1982 Brandenburg ................. 237/12.3 R

*Primary Examiner*—Henry A. Bennet
*Attorney, Agent, or Firm*—Dykema Gossett

[57] ABSTRACT

A rotary fluid swivel for use with a cab heating system of a large construction vehicle is disclosed. The cab of the vehicle may be rotated through 360 degrees with respect to the vehicle frame. The cab heating system utilizes heated fluid from an engine mounted within the frame. The heated fluid must pass into the cab to heat the cab and must then be returned back to the engine. The rotary fluid swivel consists of a first fixed boss portion extending upwardly from the vehicle frame and a second spindle portion mounted to the cab. The spindle portion is rotatable about the boss portion and includes several channels. The boss portion includes a central conduit for passage of fluid from the engine to the cab heating unit and an outer conduit for return of the fluid to the engine. Branch conduits extend outwardly from the return line to the channels within the spindle to provide sealing fluid that will also create a fluid bearing and will cool the outer periphery of the boss, thus preventing the boss from deforming to an undesirable extent.

8 Claims, 1 Drawing Sheet

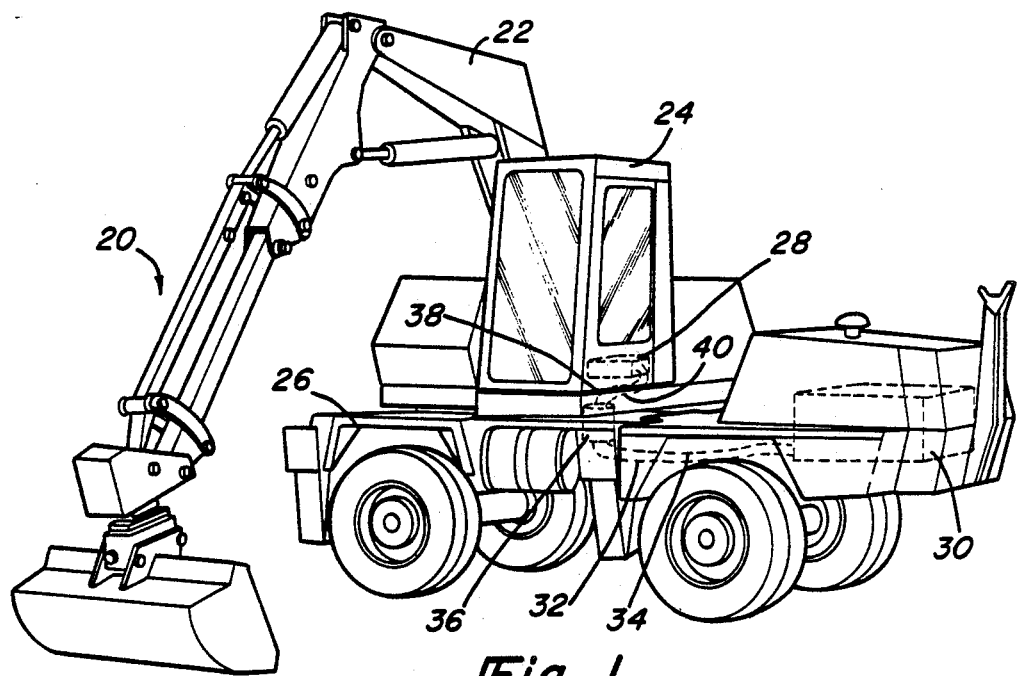
Fig-1
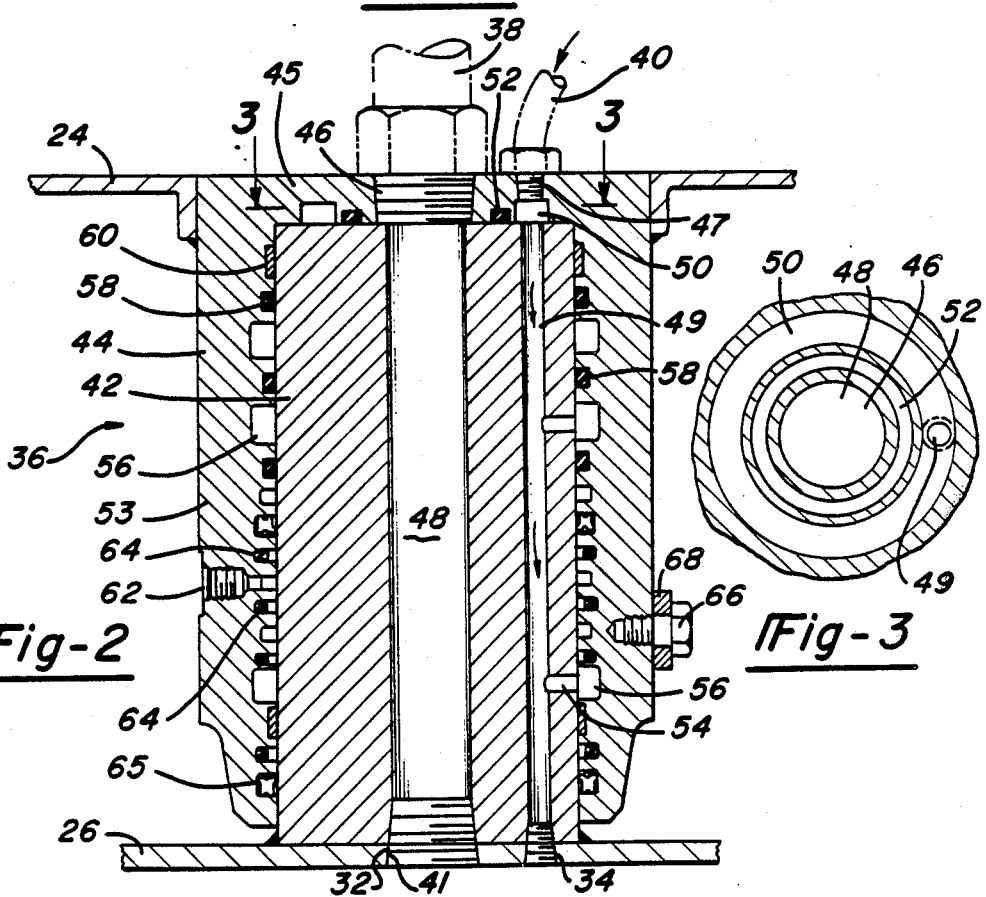
Fig-2
Fig-3

ROTARY SWIVEL FOR CAB HEATING SYSTEM

BACKGROUND OF THE INVENTION

This invention relates to a cab heating system for a large construction vehicle, and more particularly, relates to a rotary fluid swivel that communicates heating fluid from a lower frame of the vehicle to a cab that is rotatable with respect to the frame.

Modern construction vehicles often have implements and cabs that can be rotated through 360 degrees with respect to the vehicle frame. This allows the implement and cab to face, and perform work, at any angular direction with respect to the position of the vehicle frame.

Typically vehicles utilize engine heat to heat the cab of the vehicle. An engine coolant fluid is passed over a hot engine and the coolant fluid is thus heated. The coolant fluid is then circulated, as a heating fluid, through a radiator in the cab which in turn warms the air within the cab.

Problems arise when this type of cab heating system is combined with a cab that is rotated with respect to the vehicle frame since fluid lines must pass from the vehicle frame and into the cab. If a fluid line is simply passed between the vehicle frame and the cab and fixed to each, the line will become twisted as the cab rotates with respect to the frame.

The prior art attempted to solve this problem by utilizing rotary fluid swivels for interconnecting the fluid lines from the vehicle frame to the cab. An example of a rotary fluid swivel is illustrated in U.S. Pat. No. 4,211,364 assigned to the assignee of the present invention, J. I. Case Company. The heating system disclosed in this patent is not the type which utilizes an engine coolant and a radiator, but instead utilizes a rotary fluid swivel connection to communicate heated air from the vehicle frame to the vehicle cab.

This prior art swivel allows leakage of the heated air. When using heated air as a heating fluid it is not important to prevent leakage of the heating fluid. However, leakage such as allowed by the above identified swivel would be quite undesirable when the heating fluid is a hot engine coolant, such as oil.

Another prior art device is illustrated in U.S. Pat. No. 4,352,456, also assigned to the assignee of the present invention, J. I. Case Company. As broadly shown in this patent, the vehicle cab is heated utilizing an engine coolant fluid that is passed over the engine. The heated coolant fluid leaves the hot engine and is passed through a radiator mounted within the vehicle cab.

The prior rotary fluid swivel was unsatisfactory for several reasons. It tended to leak the hot fluid that was used as a heating fluid. In addition, it tended to expand upon contact with the hot fluid to an extent that the expansion could sometimes cause increased friction between the rotary cab and the vehicle frame. In addition, the prior art rotary swivel had little bearing surface for the large rotating cab.

Several manufacturers of large construction vehicles have abandoned the idea of rotary fluid swivels. Some manufacturers mount the engine to rotate with the cab. This is undesirable since it requires complex connections between the frame and the engine.

Other manufacturers use a fuel burning heater in the cab. This is undesirable since it adds fuel cost. The heat from the engine is an available and inexpensive heat source that should preferably be utilized.

It is therefore, an object of the present invention to disclose a rotary fluid swivel to connect fluid lines from the frame of a vehicle to the cab of the vehicle that will prevent leakage of the fluid.

It is further an object of the present invention to disclose a rotary fluid swivel that will avoid undue expansion of the swivel members.

Moreover, it is an object of the present invention to create a rotary fluid swivel that embodies the above-noted objects and at the same time will withstand the large stresses and strains that will be placed upon it by the large rotating members.

SUMMARY OF THE INVENTION

The present invention discloses a rotary fluid swivel for use in heating a vehicle cab that is rotatably mounted above a vehicle frame. A heating system includes a radiator mounted in the vehicle cab that receives hot coolant fluid as a heating fluid from the engine of the vehicle, which is mounted within the frame. Coolant fluid is passed over the hot engine to cool it and in the process becomes hot itself. The hot coolant fluid leaves the engine and passes through the rotary fluid swivel and to the radiator in the vehicle cab. Heat is removed from the hot coolant fluid at the radiator and the cooled fluid is returned through the rotary fluid swivel back to the vehicle frame and is again used to cool the engine.

The cab may rotate through 360 degrees with respect to the frame, and thus it is important that the rotary fluid swivel be capable of withstanding such rotation. The rotary fluid swivel includes a cylindrical boss portion formed generally solid and upstanding from the vehicle frame.

A generally hollow cylindrical spindle portion is fixed to the vehicle cab and is rotatably mounted upon the boss portion. Coolant fluid supply and return lines leading from the engine pass through the vehicle frame and lead to ports in the boss. Corresponding fluid lines are connected to openings in the spindle and lead from the spindle to the radiator within the vehicle cab.

The spindle is cup-shaped having a closed face and a cylindrical extension extending from the closed face. The spindle openings extend through the closed face and provide communication between conduits within the boss to the lines that connect to the spindle openings. The fluid supply line includes an inlet conduit formed through the center of the boss to communicate the hot coolant fluid from the engine serially through the boss, and into the spindle. As noted above, a fluid supply line connects the spindle opening to the radiator. The cooled fluid returning from the radiator is passed serially through the outer periphery of the spindle, a conduit in the outer periphery of the boss, and back to the line leading to the engine.

The spindle is fixed to the vehicle cab near the closed face and also near the end of the cylindrical extension remote from the closed face. This dual connection will prevent relative twisting between the two ends of the spindle.

Several seals are mounted at the interface of the boss and the spindle. A seal is mounted between the closed face of the cylindrical spindle and the boss and several other seals are mounted in the inner periphery of the cylindrical extension of the spindle.

Channels are formed in the inner periphery of the cylindrical extension. These channels are connected through branch conduits to the return conduit in the boss. Thus, cooled fluid returning to the engine is communicated to channels at the interface of the spindle and the boss. This cooled return fluid will act as a seal to insure that the hot fluid from the fluid inlet line will not escape from the rotary fluid swivel. In addition, this return fluid will create a fluid bearing to insure that the spindle and boss rotate smoothly with respect to each other. Also, having the cooled fluid in the outer periphery of the boss will tend to cool the boss and resist any expansion due to the hot fluid at its central portion.

BRIEF DESCRIPTION OF THE DRAWINGS

FIG. 1 illustrates a large construction vehicle embodying the rotary fluid swivel of the present invention.

FIG. 2 is a cross-sectional view through the rotary fluid swivel of the present invention.

FIG. 3 is a cross-sectional view along line 3-3 as shown in FIG. 2.

DETAILED DESCRIPTION OF A PREFERRED EMBODIMENT

As shown in FIG. 1, a large construction vehicle 20 consists of an implement 22 and a cab 24, both of which are rotatable through 360 degrees with respect to a vehicle frame 26. A radiator 28 is mounted within cab 24 and is connected to engine 30 through fluid supply line 32 and fluid return line 34. Fluid lines 32 and 34 pass through rotary fluid swivel 36 with fluid supply line 32 connected by rotary fluid swivel 36 to fluid supply line 38, and then to radiator 28. Fluid return line 40 leads from radiator 28 to rotary fluid swivel 36, back to fluid return line 34 and then to the engine 30.

As can be best seen in FIG. 2, fluid supply line 32 is connected to rotary swivel 36 at a port 41 formed in a boss 42 that is generally cylindrical and upstanding from frame 26. A spindle 44 is rotatably mounted upon boss 42. Spindle 44 is fixed to the floor of cab 24 near a closed face portion 45. Fluid supply line 38 is connected to an opening 46 in closed face 45 of spindle 44. Fluid return line 40 is connected to opening 47, also in closed face 45.

A first fluid conduit 48 can be seen to pass longitudinally through boss 42. Fluid conduit 48 communicates port 41 and fluid supply line 32 to opening 46 in spindle 44 and then to fluid supply line 38. Conduit 48 is formed at a radially central portion of boss 42. Boss 42 is generally cylindrical and solid and is nominally of a first diameter much larger than the diameter of the conduit 48. The boss 42 has a solid area extending between the outer extent of conduit 48 and the outer extent of boss 42.

Opening 47 connects return line 40 to second conduit 49 which leads to return line 34. Second conduit 49 is formed at an outer peripheral portion of boss 42 in the solid area. Returning fluid passing through conduit 49 is much cooler than the fluid within conduit 48 and the fluid within conduit 49 will tend to cool off the outer periphery of boss 42. This is important since the boss 42 may become quite hot due to the heated fluid within conduit 48 and expand. If boss 42 expands to a great extent, it may create undesirable binding friction between spindle 44 and boss 42. This could cause difficulty in the rotation of cab 24 about frame 26.

An annular channel 50 is formed within the closed face 45 of spindle 44. Annular channel 50 provides good communication between opening 47 and second conduit 49 by insuring that conduit 49 will always communicate with a portion of annular channel 50. That is, regardless of the relative rotation of cab 24 and line 40 with respect to frame 26, conduit 49 will always communicate with channel 50 which will always communicate with line 40. An additional annular channel 52 receives an O-ring to seal the interface of the spindle 44 and boss 42 between conduit 48 and conduit 49.

Spindle 44 is generally cup-shaped and has cylindrical extension 53 extending from closed face 45. Several branch conduits 54 are shown extending radially outwardly from conduit 49 to the outer periphery of boss 42. Corresponding annular channels 56 are disposed within the inner periphery of cylindrical extension 53. Cooled fluid passing through conduit 49 will flow radially outwardly through branch conduits 54 and into channels 56. This fluid will create a fluid bearing, will help to seal the interface of the two members, and will further help to cool the outer periphery of boss 42. Several 0-ring seals 58 are also mounted in the inner periphery of spindle 44. In addition, a bronze filled synthetic seal 60, such as a bronze filled Teflon ® type seal, may be mounted in the inner periphery of cylindrical extension 53.

An oil port 62 supplies oil to a space between two seals 64. Seals 64 each have a first O-ring biasing a second O-ring into contact with boss 42. The combination of the oil and the seals 64 create an effective fluid barrier to leakage. Also, the oil creates a fluid bearing. An end seal 65 is disposed near the end of cylindrical extension 53 to ensure that there will be no leakage.

A bolt 66 connects a bracket 68 to a position near the end of cylindrical extension 53 remote from closed face 45. Bracket 68 is connected to cab 24. Thus, spindle 44 is connected to cab 24 at both ends preventing relative twisting of the two ends.

As shown in FIG. 3, opening 46 and conduit 48 are formed at the central portion of boss 42 while channels 50 and 52 are formed in closed face 45 of spindle 44 at a greater radial extent than the outermost radial extent of conduit 48. In addition, conduit 49 can be seen to correspond to the radial position of channel 50.

A working embodiment of the present invention has been disclosed, however, further modifications of the invention may be made without departing from the scope and the content of the invention which can be better understood when considered in light of appended claims.

We claim:

1. A vehicle cab heating system comprising:
   a vehicle cab having a floor;
   a frame, said vehicle cab being mounted on said frame such that said vehicle cab is free to rotate 360 degrees with respect to said frame;
   a source of heated fluid mounted within said frame;
   a cab heating unit mounted in said cab, said cab heating unit utilizing fluid from said source of heated fluid to supply heat to said cab, said cab heating unit having a fluid inlet receiving heated fluid from said source, said cab heating unit removing heat from said heated fluid and having a fluid outlet for returning a cooled fluid to said source of heated fluid, a fluid supply line connecting said fluid inlet and said source of heated fluid, a fluid return line connecting said fluid outlet and said source of heated fluid;
   said fluid supply line and said fluid return line passing from said cab through a rotary fluid swivel in said floor of said vehicle cab and into said frame to connect to said source of heated fluid; and said rotary fluid swivel comprising a generally solid upstanding cylindrical boss of a first radius fixed to said frame, a generally hollow cylindrical spindle fixed to rotate with said vehicle cab floor and having an inner periphery received about said boss, said fluid supply line including a supply conduit extending through said boss at a central portion thereof, said supply conduit having a second radius, said first radius being much larger than said second radius, thus defining a solid portion between said first and said second radii, said fluid return line including a return conduit extending through said solid portion at a third radius between said first and second radii.

2. A vehicle cab heating system as recited in claim 1, wherein branch conduits extend from said return conduit radially outwardly to the outer periphery of said boss, said spindle having channels formed in said inner periphery at vertical positions corresponding to the vertical positions of said branch conduits, fluid passing through said return conduit to said channels in the inner periphery of said spindle.

3. A vehicle cab heating system as recited in claim 2, wherein said generally hollow cylindrical spindle having a closed face facing said boss at one side thereof, said closed face having an annular channel formed on said side facing said boss, said fluid return line communicating with said annular channel, said annular channel being at said third radius.

4. A vehicle cab heating system as recited in claim 3, wherein said closed face has a second annular channel formed therein, said second annular channel receiving an 0-ring, said second annular channel being at a fourth radius between said second and third radii.

5. A vehicle cab heating system as recited in claim 1, wherein said generally hollow cylindrical spindle having a closed face facing said boss at one side thereof, said closed face having an annular channel formed on a side facing said boss, said fluid return line extending from said cab heating unit to said spindle communicating with said annular channel, said annular channel being at said third radius.

6. A vehicle cab heating system as recited in claim 1, wherein said spindle has a closed face at one end thereof and a cylindrical extension extending from said closed face, said cab floor fixed to said closed face, said cylindrical extension having a bracket fixed thereto near the end of said cylindrical extension removed from said closed face, said bracket being fixed to said cab floor.

7. A vehicle cab heating system as recited in claim 6, wherein said cylindrical extension has an oil port extending therethrough to said inner periphery for receiving oil, said cylindrical extension further having seals mounted at vertical positions on both side of said oil port.

8. A vehicle cab heating system comprising:
a vehicle cab having a floor;
a frame, said vehicle cab being mounted on said frame such that said vehicle cab is free to rotate 360 degrees with respect to said frame;
a source of heated fluid mounted within said frame, said source of heated fluid including an engine;
a cab heating unit mounted in said cab, said cab heating unit utilizing fluid from said source of heated fluid to supply heat to said cab, said cab heating unit having a fluid inlet receiving heated fluid from said source of heated fluid, said cab heating unit removing heat from said heated fluid and having a fluid outlet for returning a cooled fluid to said source of heated fluid, a fluid supply line connecting said fluid inlet and said source of heated fluid, a fluid return line connecting said fluid outlet and said source of heated fluid;
said fluid supply line and said fluid return line passing through a rotary fluid swivel connecting said frame and said floor of said vehicle cab;
said rotary fluid swivel comprising a generally solid upstanding cylindrical boss of a first radius fixed to said frame, a generally hollow cylindrical spindle fixed to rotate with said vehicle cab floor and having an inner periphery received about said boss, said fluid supply line including a supply conduit extending through said boss at a central portion thereof, said supply conduit having a second radius, said first radius being much larger than said second radius, thus defining a solid portion between said first and said second radii, said fluid return line including a return conduit extending through said solid portion at a third radius between said first and second radii;
branch conduits extending from said return conduit radially outwardly to the outer periphery of said boss, said spindle having channels formed in said inner periphery at vertical positions corresponding to the vertical positions of said branch conduits, thus communicating fluid passing through said return line to said channels in the inner periphery of said spindle;
said generally hollow cylindrical spindle having a closed face facing said boss at one side thereof, said closed face having an annular channel formed on said side facing said boss, said fluid return line extending from said cab heating unit to said spindle communicating with said annular channel, said annular channel being at said third radius;
said closed face having a second annular channel formed therein, said second annular channel receiving an 0-ring, said second annular channel being at a fourth radius between said second and third radii;
said spindle having a cylindrical extension extending from said closed face, said cab floor fixed to said closed face, said cylindrical extension having a bracket fixed thereto near the end of said cylindrical extension removed from said closed face, said bracket being fixed to said cab floor; and
said cylindrical extension having an oil port extending therethrough to said inner periphery for receiving oil, said cylindrical extension further having seals mounted at vertical positions on both side of said oil port.

* * * * *